is

United States Patent [19]
Bodeep et al.

[11] Patent Number: 5,631,757
[45] Date of Patent: May 20, 1997

[54] FULL-DUPLEX DATA COMMUNICATION SYSTEM USING DIFFERENT TRANSMIT AND RECEIVE DATA SYMBOL LENGTHS

[75] Inventors: George E. Bodeep, Lawrenceville, Ga.; Sheryl L. Woodward, Lincroft, N.J.

[73] Assignee: Lucent Technologies Inc., Murray Hill, N.J.

[21] Appl. No.: 473,848

[22] Filed: Jun. 7, 1995

[51] Int. Cl.[6] .......................... H04B 10/24; H04B 10/00
[52] U.S. Cl. .......................... 359/113; 359/152; 370/24; 455/73; 375/219
[58] Field of Search .......................... 359/113, 152, 359/143, 158, 135, 154, 167, 184; 375/219; 370/8, 11, 24, 29, 110–4, 111, 31–32, 44; 455/73, 78, 89

[56] References Cited

U.S. PATENT DOCUMENTS 5,255,111  10/1993  Kwa ........................................... 359/152
5,347,562  9/1994  Candy ........................................... 370/8
5,349,461  9/1994  Huynh et al. ............................... 359/152
5,483,551  1/1996  Huang et al. ............................... 375/219

FOREIGN PATENT DOCUMENTS 0292996  11/1988  European Pat. Off. ................ 375/219

*Primary Examiner*—Wellington Chin
*Assistant Examiner*—Kinfe-Michael Negash

[57] ABSTRACT

A data communication system includes a novel transceiver which uses different transmit and receive data symbol lengths enabling the transceiver to operate in a full-duplex mode. The transceiver transmits data of a first type over a communication link during a first time period, and receives data of a second type over the link during a second time period which is longer than the first time period and which overlaps a portion of the first time period. In one embodiment, the transceiver switches a transmitting means to the link during the first time period and connects a receiving means to the link during a portion of the second time period which does not overlap the first time period.

26 Claims, 5 Drawing Sheets

FULL-DUPLEX DATA COMMUNICATION SYSTEM USING DIFFERENT TRANSMIT AND RECEIVE DATA SYMBOL LENGTHS

FIELD OF THE INVENTION

This invention relates to full duplex communication systems and, more particularly, to a system utilizing different data symbol lengths for the transmission and reception of data.

BACKGROUND OF THE INVENTION

Half-duplex data communication systems are undesirable because of the inherent delay which exists between the transmission and reception of data. While delay can be reduced from the round-trip delay which occurs in "ping-pong" type half-duplex systems, it comes at the cost of some system complexity. Existing full-duplex data communication systems utilize techniques such as frequency division multiplexing which requires the use of expensive system components such as modems, multiplexers, demultiplexers, filters, etc. Full-duplex optical data links (ODL) utilize techniques such as wave division multiplexing which require specialized devices such as optical couplers, splitters, wavelength routers, etc. In certain full-duplex data communication system applications, such as providing broadband data services to the home over existing cable facilities or new optical fibers, the cost is a critical factor in the provisioning of these data services.

What is needed is a simple and low-cost full-duplex data communication technique that can be utilized over cable and/or optical fiber systems.

SUMMARY OF THE INVENTION

In accordance with the present invention, a data communication system includes a novel transceiver which uses different transmit and receive data symbol lengths enabling the transceiver to operate in a full-duplex mode. The transceiver transmits data of a first type over a communication link during a first time period, and receives data of a second type over the link during a second time period which is longer than the first time period and which overlaps a portion of the first time period. The transceiver switches a transmitting means to the link to transmit the first type of data during the first time period and connects a receiving means to the link to detect the received second type of data during a portion of the second time period which does not overlap the first time period. In one embodiment, the first and second types of data are such that they cannot be separated at the transceiver on the basis of a spectral content of signals representing the first and second types of data.

DETAILED DESCRIPTION

In the following description, each item or block of each figure has a reference designation associated therewith, the first number of which refers to the figure in which that item is first located (e.g., 110 is located in FIG. 1).

Figure 1:
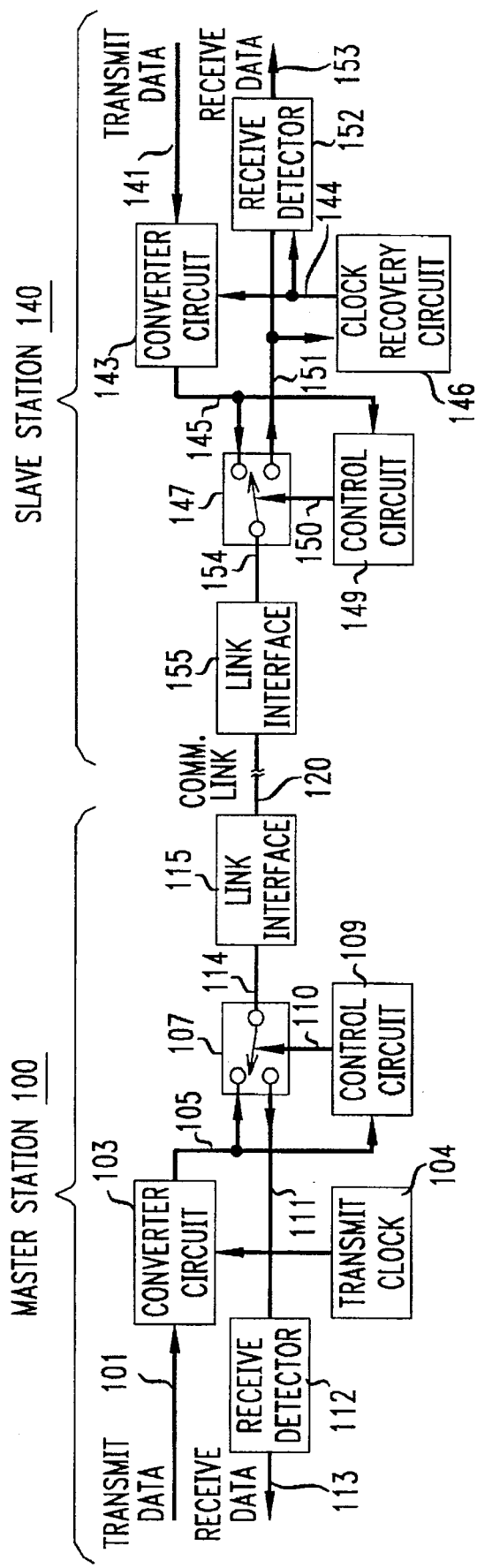
FIG. 1 is an illustrative block diagram of a full-duplex data communication system in accordance with the present invention.

Shown in FIG. 1 is an illustrative block diagram of a full-duplex data communication system utilizing different transmit and receive data symbol lengths. The system includes, illustratively, a master station 100 (also referred to hereinafter as a master transceiver) connected over a communication link 120 to a slave station 140 (hereinafter also referred to as a slave transceiver). In accordance with the present invention, master station 100 transmits data of a first type (e.g., first symbol length) over communication link 120 to slave station 140 during a first time period. The master station 100 is arranged to receive data of a second type over communication link 120 during a second time period which is longer than the first time period and which, depending upon the delay over communication link 120, may overlap a portion of the data in the first time period. By utilizing a longer second time period for receiving data, the master station can separate the received data from the transmitted data even when these data cannot be separated on the basis of the spectral content of the signals that represent the transmitted and received data. This is accomplished using a switch 107 (e.g., a Field Effect Transistor FET switch) which connects the transmit circuit to communication link 120 during the first time period (transmit mode) and connects the receive circuit to link 120 during the portion of the second time period which is not overlapped by the first time period. Switch 107 operates under control of control circuit 109 which derives its timing from the transmit data signal on lead 105.

The slave station 140 receives the transmitted data and recovers the clock signal therefrom to synchronize data transmissions from slave station 140 to master station 100. Consequently, there is no overlap of the data being received at or transmitted from slave station 140.

In accordance with the invention, link 120 may be wireless or may be a wire pair, a cable, or optical fiber link. Moreover the transmitted and receive data pulses may be binary level or other multi-level pulses. The data sent during the first and second time period may, more generally, be considered to be a data symbol which may be one or multiple data bits. When the data symbol is multiple data bits, these multiple bits must be arranged so that they can be detected in the portion of the second time period which is not overlapped by the first time period. For convenience, the following description assumes that a data symbol is a data bit.

As shown in master station 100 of FIG. 1, transmitted data is received over lead 101 and is converted to the desired data symbol form (e.g., data pulse) and synchronized using the transmit clock 104 in converter circuit 103. The output of converter circuit 103 connects over lead 105 to switch 107 which operates under control of control circuit 109. Control circuit 109 can use either received data pulses from converter circuit 103 or clock pulses from clock 104 to generate a control signal on lead 110. (This is not true for control circuit 149 of the slave station 140.) The control signal on lead 110 controls the position of switch 107. Switch 107 enables transmit data pulses to be outputted on lead 114 during a first time period and enables any received data pulses on lead 114 to be switched to receive lead 111 during a second time period. The received data pulses are detected by receive detector 112 and outputted as received data on lead 113.

Switch 107 connects over lead 114 to link interface 115 which converts transmitted data pulses to the data pulse form needed for transmission over communication link 120. Link interface 115 also receives data pulses from communication link 120 and converts them to the data pulse form needed by master station 100. Link interface 115 may, illustratively, convert baseband electrical data signals on lead 114 to and from the baseband modulated electrical, wireless or optical signals of communication link 120. For example, the master station 100 may be arranged to operate with baseband electrical data pulses while communication link 120 may be an optical communication link and link interface 115 would be used to make the electrical-to-optical and optical-to-data pulse conversions. Thus, baseband electrical data pulses at master station 100 can be converted to optical data pulses by link interface 115 for communication over an optical communication link 120 and link interface 115 would convert optical data pulses received over optical communication link 120 to baseband electrical pulses for master station 100.

At slave station 140, link interface 155 operates in the same manner as link interface 115. The output of link interface 155 connects over lead 154 to switch (e.g., FET switch) 147. Switch 147 switches slave station 140 from a transmit data mode to a receive data mode. During a transmit mode, transmit data on lead 141 is converted to the desired form by converter circuit 143 and outputted on lead 145. Converter circuit 143 operates in the same manner as converter circuit 103 except that it uses a receive clock 144 that is derived by clock recovery circuit 146 from the receive data pulses outputted by switch 147. The received data pulses on lead 151 are also detected by receive detector 152, which operates in the same manner as receive detector 112, to produce the received data signal 153. Switch 147 operates under control of control signal 150 generated by control circuit 149. Control circuit 149 derives its timing from the transmitted data pulses on lead 145 from converter circuit 143. Consequently, control circuit 149 as well as circuit 143 receive their timing from clock recovery circuit 146. In accordance with the present invention, slave station 140 transmits in the time interval between data receptions.

Figure 2A:
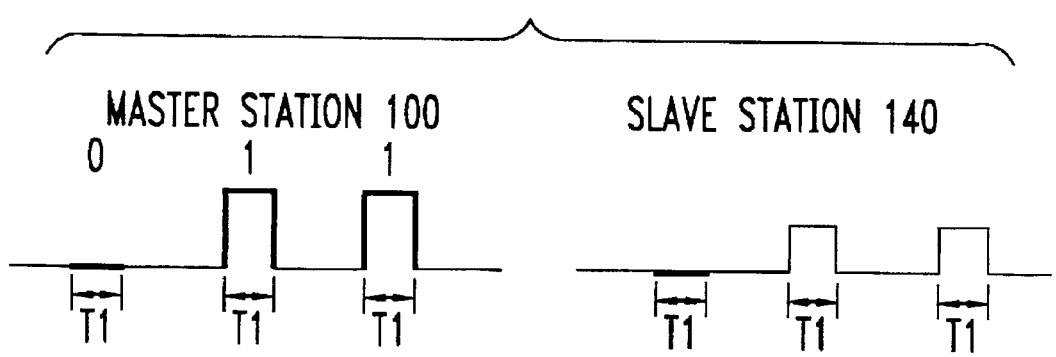
FIG. 2 shows an illustration of the transmitted and received data pulses as they appear at the master and slave stations of the system.
Figure 2B:
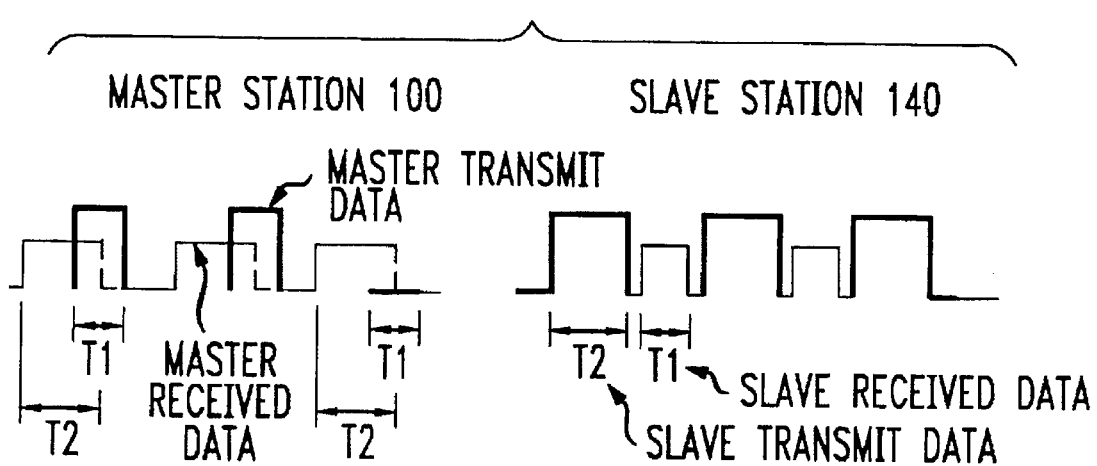
Figure 2C:
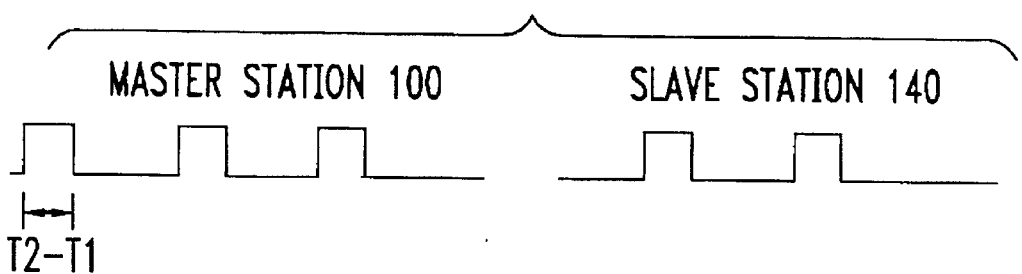

With joint reference to FIGS. 1 and 2, we describe in more detail the operation of the present invention. Shown in FIG. 2a—left, illustratively, the master station 100 transmits data stream 011 as short binary pulses (time period T1) to slave station 140. Shown in FIG. 2a—right is an illustration of the deteriorated binary data pulses as they are received at slave station 140. Slave station 140 operates only in a receive mode until clock recovery circuit 146 has synchronized the receive clock 144 to the transmit clock 104 derived from the received data pulses on lead 151. Once slave station 140 is synchronized to the transmit clock 104, it can begin transmitting bits, as shown in FIG. 2b—right, transmitting only during the portion of the bit period (time period T2) not used by the master station 100 for data transmission (referred to as time period T1). The deteriorated data pulses from slave station 140 arrive at master station 100 after a random delay determined by the length of communication link 120 between the master and slave stations. Because the data pulses transmitted from slave station 140 are longer, they cannot be totally overlapped by the data pulses transmitted from master station 100. Thus, even if the slave data pulses arrive at the master station 100 while a master pulse is being transmitted (as shown in FIG. 2b—left), a non-overlapped portion of the slave data pulse will be detectable by receive detector 112. FIG. 2c—left shows the resulting output data pulse (T2–T1) from switch 107 representing the received data. The switch 107 switches from the transmit data on lead 105 (transmit mode) to the receive data on lead 111 (receive mode) under control of control circuit 109. As previously noted, control circuit 109 derives its timing from the transmit data signal on lead 105. FIG. 2c—right shows the received data outputted from switch 147.

It should be noted that because the transmit data pulses may have an amplitude much greater than the received data pulses, in many practical systems the transmit data pulse will take a significant fraction of a bit period to decay down to the "no pulse" level. Typically, this happens more often in optical data links than in electrical data links. Consequently, in any practical system, control circuit 109 may need to generate a pulse width that is wider than the pulse width of the transmit data signal on lead 105. Thus, the first time period (T1) should be greater than or equal to the pulse width of the master station transmit data pulses (TM) and less than the received data pulses, second time period (T2). The time period T1 should be selected so as to ensure that the master station transmit data pulses have decayed sufficiently so as not to affect the reception of the received data pulses. Additionally, the time period T2–T1 should be sufficiently long enough to enable master station 100 to detect and decode the received data pulses.

Figure 3:
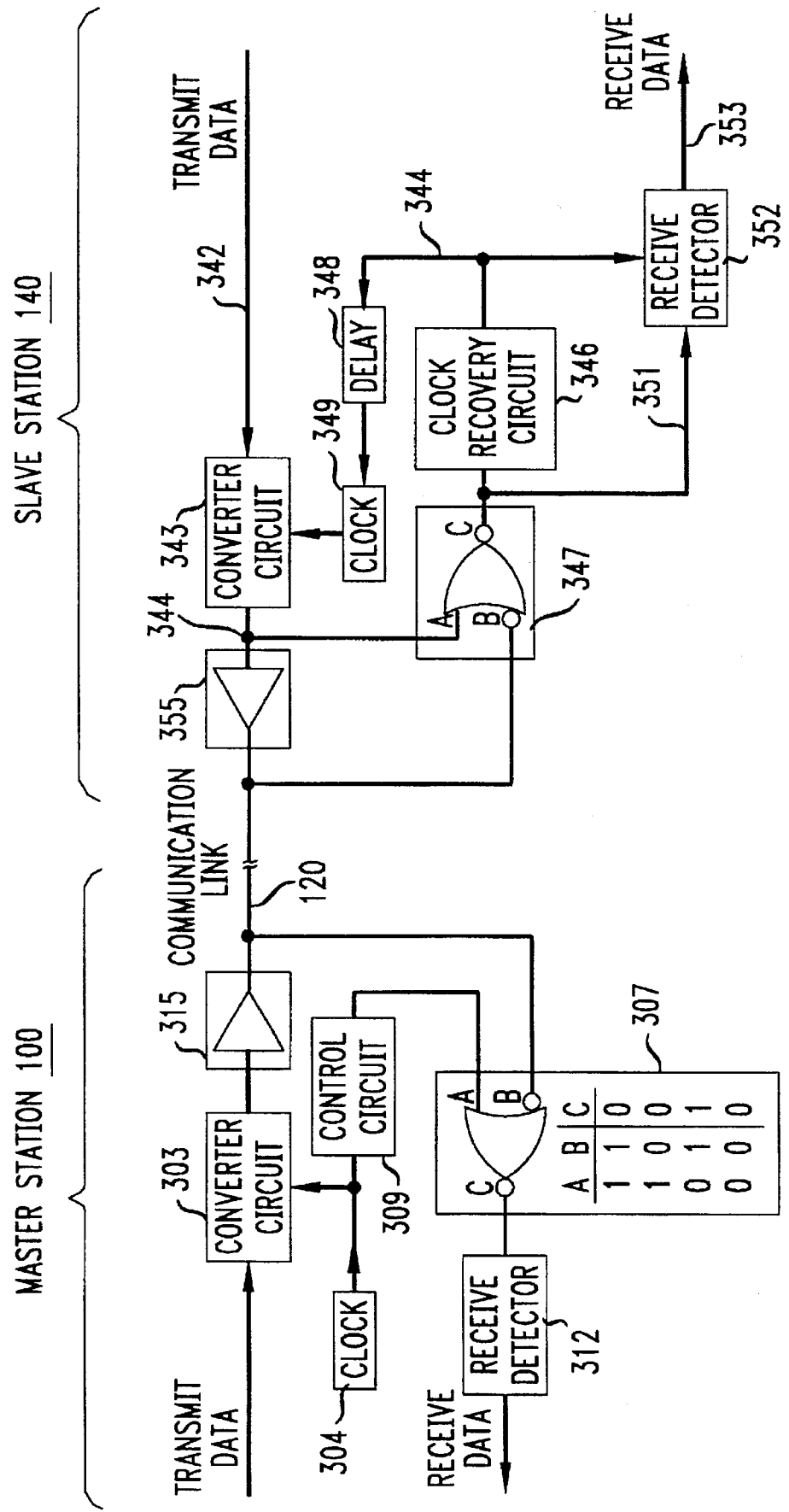
FIG. 3 illustrates a block diagram of a master station and a slave station.

With reference to FIG. 3, we describe a more detailed block diagram of the present invention. In this particular embodiment of master station 100, the link interface 315 is an amplifier which amplifies the transmit data signal and couples it to the communication link 120. The switch circuit 307 is, illustratively, implemented as a logic circuit which has the transfer function shown in the associated "truth" table. In this embodiment, we assume that the transmit data pulses have a pulse width TM which is the pulse width of the clock pulses 304. The control circuit 309 converts the clock pulses to pulses having the pulse width equal to time period T1. These pulses provide input A to logic circuit 307 (hereinafter referred to as a switch or a switch circuit). Input B is connected illustratively directly to the communication link 120. As shown in the truth table, the output C exists only when input A is not present (logic 0). Thus, switch 307 couples the received data signal from communication link 120 to receive detector 312 only during the absence of a transmitted data pulse from amplifier 315. The remaining circuits 303 and 312 operate in the same manner as previously described circuits 103 and 112, respectively, of FIG. 1.

In the particular embodiment of the slave station 140, the link interface 355 (essentially the same as link interface 315) couples slave transmit data pulses to communication link 120. The logic circuit 347 (hereinafter referred to as a switch or a switch circuit) is implemented and operates in the same manner as the previously described switch 307. Consequently, the switch 347 gates signals received over communication link 120, via output C, to clock recovery circuit 346 and receive detector 352 when input A is logic 0, that is, only during the period of time when there is no data being transmitted from slave station 140. Clock recovery circuit 346 generates a receive clock 344 that is used by receive detector 352 to time the recovery of the received data signal 351. The receive clock 344 is delayed by delay circuit 348 to produce the transmit clock 349. The magnitude of the delay is selected to ensure that transmit data pulses from slave station 140 are interleaved between the received data pulses as shown in FIG. 2b—right. The converter circuit 343 uses the transmit clock 349 to generate and time the transmit data pulses which are sent over communication link 120. The output of converter circuit 343 provides the transmit data as input A of switch circuit 347 while input B connects to link 120. As a result, switch circuit 347 selectively gates the combined signal on link 120, shown in FIG. 2b—right, (which appears at input B) with the transmit data pulses (which appear at input A) to generate the received signal 351 as shown in FIG. 2c—right.

Figure 4:
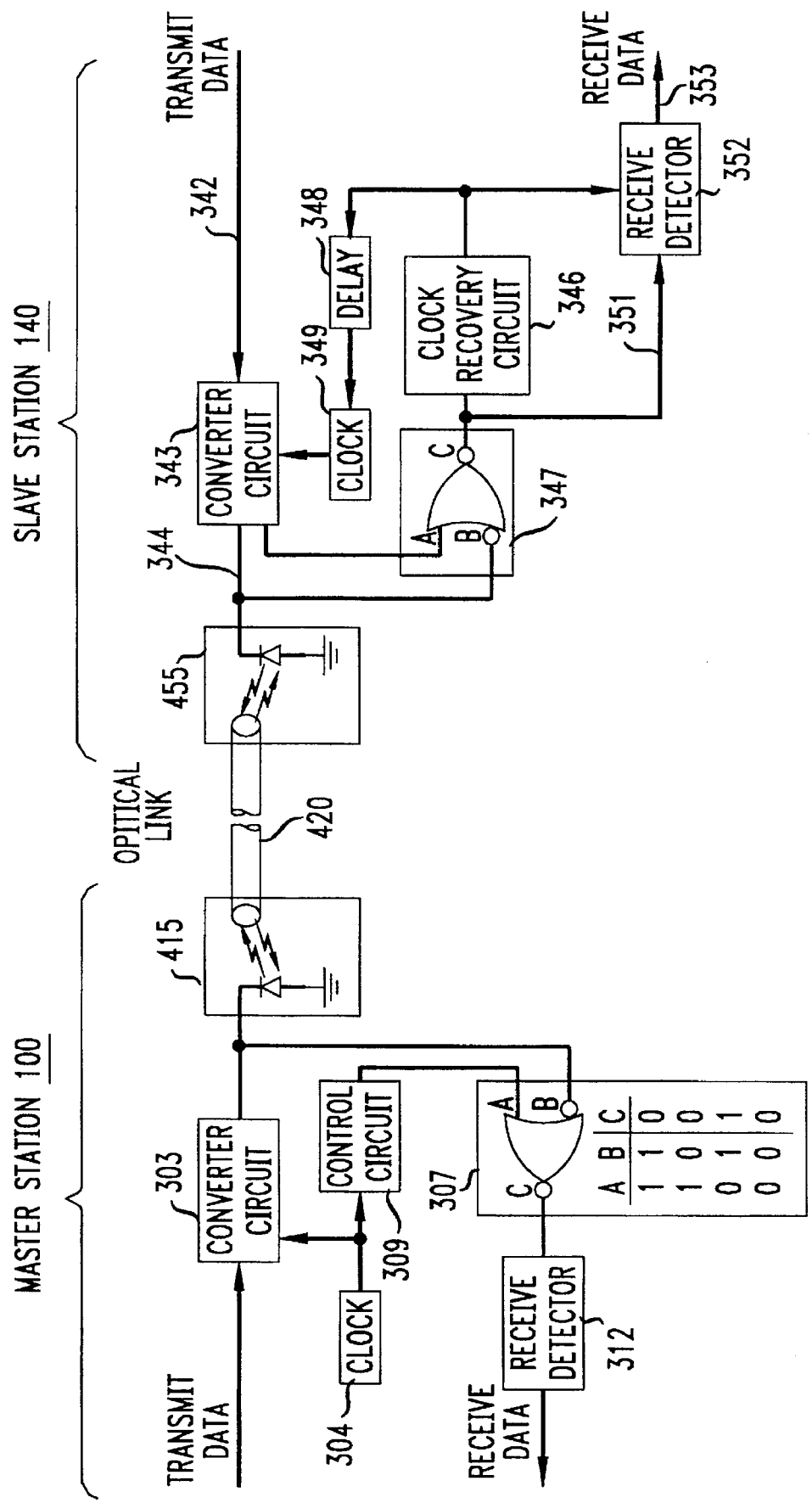
FIG. 4 shows an illustrative block diagram of an optical data communication system in accordance with the present invention.

With reference to FIG. 4, we describe another illustrative embodiment of the present invention in which communication link 420 is an optical fiber and where link interface 415 and 455 each include a Fabry-Perot laser. In accordance with one aspect of the invention, the Fabry-Perot laser is used as a transceiver, that is, it is used both to transmit data pulses and to receive data pulses. Using such an inexpensive laser as both the transmitter and receiver eliminates the need for a separate optical receiver (e.g., optical detector) and an optical splitter, the optical splitter being necessary to separate the transmit data pulses from the receive data pulses.

Figure 5:
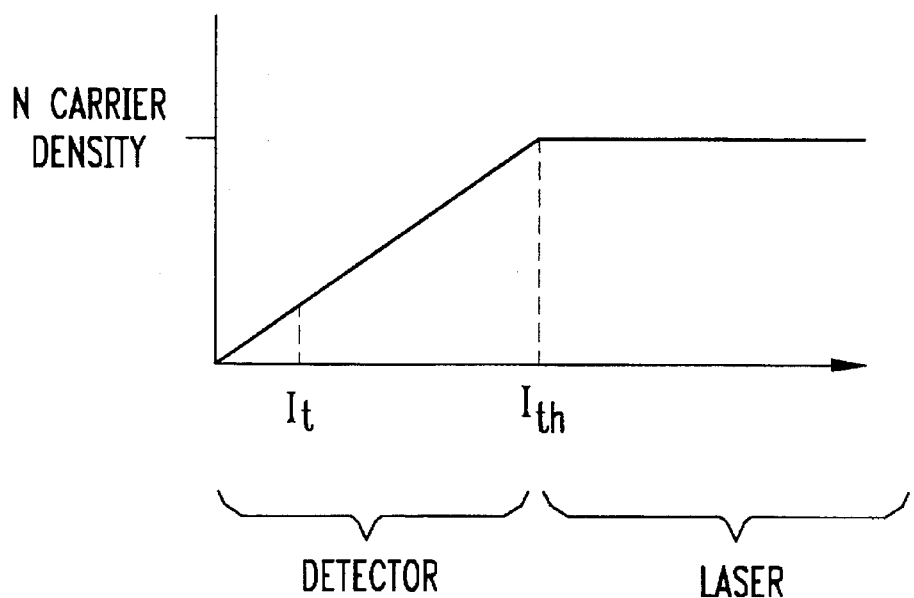
FIG. 5 shows a typical operating characteristic of a Fabry-Perot laser.

With reference to FIG. 5, there is shown a typical operating characteristic of a Fabry-Perot laser. As shown, when the laser current exceeds the threshold $I_{th}$ the carrier density N is sufficient to produce light from the laser. When the laser current is less than $I_{th}$ but higher than the transparency current $I_t$, the laser can act as a detector, but unfortunately is polarization-dependent. We have noted that in the current region below the transparency threshold $I_{th}$ the laser detection is good and only minimally polarization-dependent. The laser also acts as an effective detector if it is reverse-biased or if it has no bias voltage, and hence under these bias conditions no current flows in the laser. In such a mode of operation, results have indicated that the laser operates as a detector with minimal polarization-dependence.

In the system shown in FIG. 4, the lasers used in link interface 415 and 455 can act as a receiver only after the voltage pulse from the transmitted logic "1" has sufficiently decayed. While this non-zero decay time (caused by the capacitance of the laser) limits the data transmission rate of the system, it should improve as new lasers having lower capacitance are developed. This non-zero decay time is handled in accordance with the present invention by setting time period T1 to be greater than the transmit data pulse width TM by an amount of time that exceeds the decay time of the laser.

Figure 6:
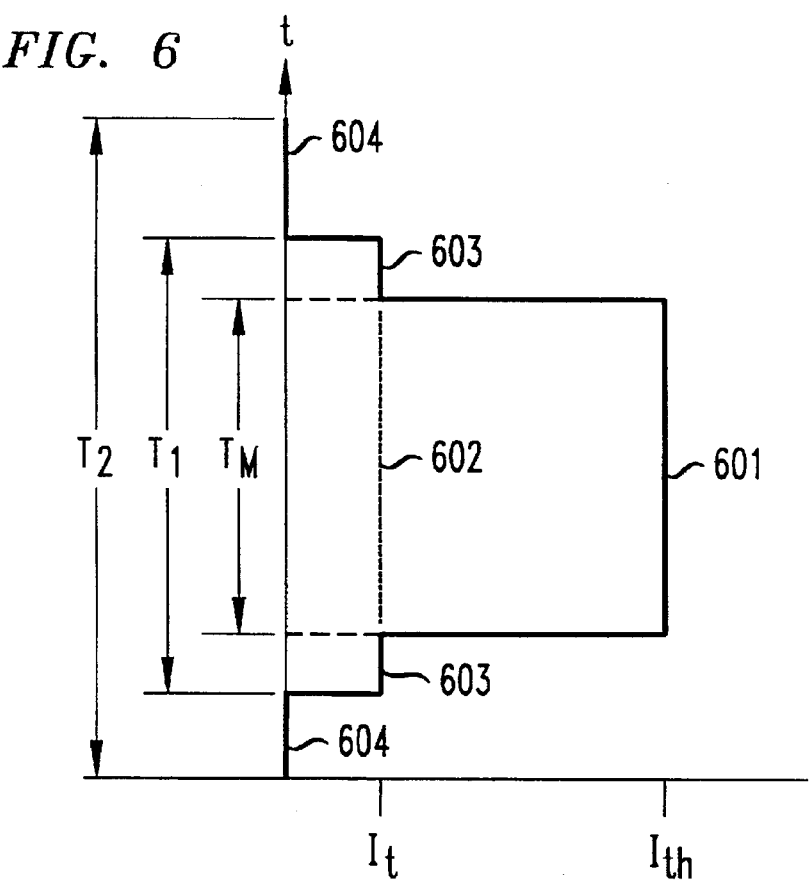
FIG. 6, illustratively, shows the biasing of the laser of FIG. 4 during the transmit and receive operating modes.

With joint reference to FIGS. 4 and 6, we illustratively describe operation of the laser in link interface 415 as follows. In the arrangement of FIG. 4, the converter circuit 303 controls the biasing of the laser in interface 415. During the master transmit time TM, when the laser is to transmit a light signal (e.g., logic 1 data), converter circuit 303 biases the laser at or above the threshold current $I_{th}$ (601). If the laser is not to transmit a light signal (e.g., logic 0 data), it is biased below threshold current $I_{th}$, illustratively shown as 602 (note that the laser can even be unbiased or reversed biased). At times outside of TM but within the time period T1, the laser is biased below threshold $I_{th}$, illustratively shown by 603. Again, the laser can even be unbiased or reversed biased. As previously noted, during this time period this laser is turned off and its light signal is decaying toward zero.

At time periods outside of T1 and within T2 (or, more generally, at all times other than T1), the laser is biased to operate as a good detector and so is biased below $I_t$, as shown by 604. (In preferred embodiments, the laser may be unbiased or even reversed biased.)

During the receive mode (i.e., T2–T1), the laser detects light signals received over optical link 420 from slave station 140. The detected optical signal causes a change in signal voltage across the laser, i.e., on lead 144. This signal voltage is coupled to the input B of switch 307. The input A of switch 307 is generated by control circuit 309.

The operation of the laser in slave station 140 interface 455 operates in the same manner as the laser of interface 415. Received optical signals are converted by the laser of interface 455 to electrical signals which are coupled to the input B of switch 347. The input A of switch 347 is generated as a separate slave transmit signal from converter circuit 343. In a preferred embodiment, the switches 307 and 347 may be Field Effect Transistor (FET) or other types of switches, as shown by 107 and 147 of FIG. 1, rather than the logic gates shown.

The remaining circuit elements of master station 100 and slave station 140 of FIG. 4 operate in the same manner as previously described for FIG. 3.

While the present invention has been described as using a Fabry-Perot semiconductor laser, it can also operate using other types of semiconductor lasers or optical transceivers, such as a light emitting diode or photonic integrated transceiver.

Additionally, while the present invention has been described as using clock recovery circuit 346 at the slave station 140, it can also be implemented using an independent clock source at the slave station 140 which can accurately measure the allowed transmit period T2 for the slave station 140. In this embodiment, the slave station 140 would use the end of the received data period T1 as a trigger to start the transmit data period T2.

What has been described is merely illustrative of the application of the principles of the present invention. Other arrangements and methods can be implemented by those skilled in the art without departing from the spirit and scope of the present invention.

What is claimed is:

1. A transceiver for transmitting and receiving data over a communication link, comprising
    means for transmitting data of a first type over the link during a first time period,
    means for receiving data of a second type over the link during a second time period which is longer than the first time period and which overlaps a portion of the first time period, and
    wherein the first and second types of data cannot be separated at the transceiver on the basis of a spectral content of signals representing the first and second types of data.

2. The transceiver of claim 1 further including switch means for connecting the transmitting means to the link during the first time period and for connecting the receiving means to the link during a portion of the second time period which does not overlap the first time period.

3. The transceiver of claim 1 further including a logic circuit for subtracting the received data from the transmitted data.

4. The transceiver of claim 1 wherein the first time period is less than one-half of a predefined data interval and the second time period is greater than the first time period but less than the predefined data interval minus the first time period.

5. The transceiver of claim 1 wherein the second type of data is a single data symbol which can be detected by the receiving means in a portion of the second time period which is not overlapped by the first time period.

6. The transceiver of claim 1 wherein the first type of data is a single data bit.

7. The transceiver of claim 1 wherein the first type of data is a data symbol including one or more data bits.

8. The transceiver of claim 1 wherein the first type of data is a data packet having one or more sequential data symbols.

9. An optical transceiver for transmitting and receiving data over a communication link, comprising means for transmitting data of a first type over the link during a first time period, means for receiving data of a second type over the link during a second time period which is longer than the first time period and which overlaps a portion of the first time period.

10. The optical transceiver of claim 9 wherein the first and second types of data cannot be separated at the transceiver on the basis of a spectral content of signals representing the first and second types of data.

11. The optical transceiver of claim 9 wherein the transmitting means and receiving means are optical means and the communication link is an optical fiber.

12. The optical transceiver of claim 11 wherein the transmitting means and receiving means include a laser common to both.

13. The optical transceiver of claim 11 wherein the transmitting means and receiving means include a light-emitting diode common to both.

14. The optical transceiver of claim 11 wherein the transmitting means and receiving means include a photonic integrated laser/detector circuit.

15. The optical transceiver of claim 9 further including switch means for connecting the transmitting means to the link during the first time period and for connecting the receiving means to the link during a portion of the second time period which does not overlap the first time period.

16. The optical transceiver of claim 9 further including a logic circuit for subtracting the received data from the transmitted data.

17. The optical transceiver of claim 9 wherein the first time period is less than one-half of a predefined data interval and the second time period is greater than the first time period but less than the predefined data interval minus the first time period.

18. A full-duplex data communication system including a master and a slave transceiver for transmitting and receiving data over a communication link, comprising at the master transceiver, first means for transmitting to the slave transceiver data of a first type over the link during a first time period, second means for receiving from the slave transceiver data of a second type over the link during a second time period which is longer than the first time period and which overlaps a portion of the first time period, at the slave transceiver, third means for transmitting to the master transceiver data of the second type over the link during the second time period, fourth means for receiving from the master transceiver data of the first type over the link during the first time period, wherein at both the master and slave transceivers, the first and second types of data cannot be separated on the basis of a spectral content of signals representing the first and second types of data.

19. The system of claim 18 including at both the master and slave transceivers a logic circuit for separating the received data from the transmitted data.

20. The system of claim 18 wherein the first time period is less than one-half of a predefined data interval and the second time period is greater than the first time period but less than the predefined data interval minus the first time period.

21. The system of claim 18 wherein the master transceiver includes a transmit clock for establishing the first time period and wherein the slave transceiver recovers a clock signal from the first type of data received from the master transceiver and uses the recovered clock signal to time the third means for transmitting.

22. A full-duplex optical data communication system including a master and a slave optical transceiver for transmitting and receiving data over a communication link, comprising at the master transceiver, first means for transmitting to the slave transceiver data of a first type over the link during a first time period, second means for receiving from the slave transceiver data of a second type over the link during a second time period which is longer than the first time period and which overlaps a portion of the first time period, at the slave transceiver, third means for transmitting to the master transceiver data of the second type over the link during the second time period, and fourth means for receiving from the master transceiver data of the first type over the link during the first time period.

23. The system of claim 22 wherein at both the master and slave transceivers, the first and second types of data cannot be separated on the basis of a spectral content of signals representing the first and second types of data.

24. The system of claim 22 wherein the first and third means for transmitting and the second and fourth means for receiving are optical means and the communication link is an optical fiber.

25. A method of operating a transceiver for transmitting and receiving data over a communication link, comprising the steps of transmitting data of a first type over the link during a first time period, and receiving data of a second type over the link during a second time period which is longer than the first time period and which overlaps a portion of the first time period, the second type of data being such that it cannot be separated from the first type of data on the basis of a spectral content of signals representing the first and second types of data.

26. A method of operating an optical transceiver for transmitting and receiving data over a communication link, comprising the steps of transmitting data of a first type over the link during a first time period, and receiving data of a second type over the link during a second time period which is longer than the first time period and which overlaps a portion of the first time period, the second type of data being such that it cannot be separated from the first type of data on the basis of a spectral content of signals representing the first and second types of data.

* * * * *